United States Patent Office

Re. 27,582
Reissued Feb. 6, 1973

27,582

METAL-CONTAINING DETERGENT-DISPERSANTS FOR LUBRICANTS

Donald J. Kahn, Metuchen, Max L. Robbins, South Orange, and Frieder S. Furer, Wayne, N.J., assignors to Esso Research and Engineering Company No Drawing. Original No. 3,451,931, dated June 24, 1969, Ser. No. 575,971, Aug. 30, 1966, which is a continuation-in-part of Ser. No. 333,614, Dec. 26, 1963. Application for reissue June 21, 1971, Ser. No. 155,367
Int. Cl. C10m *1/32, 3/20, 5/20*
U.S. Cl. 252—32.7 E 20 Claims

Matter enclosed in heavy brackets [ ] appears in the original patent but forms no part of this reissue specification; matter printed in italics indicates the additions made by reissue.

ABSTRACT OF THE DISCLOSURE

An overbased detergent-dispersant for an oil composition is prepared by reacting a metal base, such as barium hydroxide or calcium hydroxide, with an acidic gas such as $CO_2$, $H_2S$, or $SO_2$ in the presence of an amide, imide or ester derived from a high-molecular-weight monocarboxylic or polycarboxylic acid of from 40 to 250 carbon atoms and from an organic nitrogen-containing compound having at least one amino group or hydroxy group, including alkylene polyamines, hydroxyalkyl amines and N-hydroxy alkyl morpholinones. Useful compositions are prepared by blending these reaction products into fuels and lubricants.

This application is a continuation-in-part of application Ser. No. 333,614, filed Dec. 26, 1963, and now abandoned.

The present invention relates to improved detergent-dispersant type additives for lubricating oil compositions, to processes for making such additives, and to finished lubricating oil compositions and oil concentrates containing such additives. The additives may be characterized generally as colloidal dispersions of metal salts, e.g., alkali metal and/or alkaline earth metal salts, principally salts of acidic gases, e.g., carbonates of those metals, in admixture with certain nitrogen containing derivatives of high molecular weight carboxylic acids, e.g., alkenyl succinic acid anhydrides, these latter materials serving both as dispersing aids for the colloidal dispersion and as detergents and/or dispersants in the lubricating oil composition in which the additives are incorporated.

In order to ensure adequate lubrication of high compression piston-type internal combustion engines, i.e., to minimize wear and to keep the various parts of the engine free of varnish, carbonaceous deposits and sludge, it has been found necessary to employ in the lubricants for such engines various types of detergent additives. Studies over a number of years have lead to the development of the so-called basic soaps or "overbased" salts of various organic acidic materials such as metal alkyl phenates, metal salts of alkyl phenol sulfides (i.e., thioethers of alkyl phenols), metal salts of organic sulfonic acids, and the like. One method for the preparation of such basic soaps or salts involves the mere use of an excess of neutralizing agent in the form of an oxide, hydroxide or carbonate of the desired metal. This produces a material which contains an amount of metal in excess of the amount that is theoretically required to replace the acidic hydrogen of the organic acid that has been employed as the starting material. Related additives that have the advantage of basic salts are metal complexes or colloidal dispersions of inorganic salts or of metal oxides or hydroxides wherein there is a high ratio of metal to organic acid component. It is to this latter type of additive that the present invention is directed.

Earlier workers in the art of lubricant additives have proposed the preparation of a detergent-dispersant or combined detergent and inhibitor additive by reacting a metal base, usually an alkaline earth metal oxide and/or hydroxide with an acidic gas, usually carbon dioxide, in the presence of one or more of various promoters such as alkyl phenols and in the presence of a dispersant such as a phosphosulfurized hydrocarbon. In systems of this nature, the phosphosulfurized hydrocarbon serves as a dispersant that maintains the colloidal dispersion. In previous work it was found that in order to increase the metal content of the system it was necessary to increase the amount of dispersant also. Inasmuch as the dispersant represents a considerable item in the overall cost of the additive composition, there has been an incentive to develop methods for attaining high ratios of metal to dispersant in stable compositions of this type. Some prior patents relating to systems of this type include U.S. Patents Nos. 2,616,911, 2,695,910, 2,723,235, 2,777,874, 2,856,360, 2,956,018, and 3,057,896.

It has now been found, in accordance with the present invention, that a metal-containing detergent-dispersant additive (particularly one containing an alkali metal or alkaline earth metal) having a high ratio of metal to dispersant can be prepared by suspending a metal base e.g., an alkali metal or alkaline earth metal oxide or hydroxide, in a nitrogen-containing dispersant derived from a high molecular weight carboxylic acid such as alkenyl succinic anhydride and treating the suspension with an acidic gas such as carbon dioxide. The resulting material is a colloidal dispersion of metal salt, e.g., carbonate, in which the colloidally dispersed salt contributes detergency and thus cooperates with the dispersant to furnish a highly effective detergent-dispersant additive for oil compositions.

The nitrogen-containing dispersants that are employed in the present invention are derivatives of high molecular weight carboxylic acids. One commonly used type comprises alkenyl succinic anhydride derivatives, including those selected from the class consisting of the reaction products of alkenyl succinic anhydrides with polyamines (see U.S. Patents Nos. 3,172,892, 3,154,560, 3,024,237, etc.), other amines (see U.S. Patent No. 3,219,666), the reaction products of alkenyl succinic anhydrides with polyamines and carboxylic acids (see U.S. Patent No. 3,216,936), the products obtained by further reacting the latter materials with acidic organic compounds containing phosphorus and sulfur (see U.S. Patents Nos. 3,184,412 and 3,185,643), and the reaction products of alkenyl succinic anhydrides with polyhydric alcohols and polyamines.

Other nitrogen-containing dispersants are taught in Belgian Patent No. 662,875 wherein a nitrogen-containing hydroxy compound is reacted with an alkenyl succinic anhydride to form an ester. Specifically, this Belgian patent teaches dispersants comprising N - alkyl morpholinone esters, e.g., the ester of N - (2 - hydroxyethyl)-2-morpholinone and a polyisobutenyl succinic anhydride.

Thus, the dispersants employed in the present invention comprise amides, imides, salts and esters prepared by reacting monocarboxylic or polycarboxylic acids of high molecular weight with organic compounds containing amino nitrogen and/or heterocyclic nitrogen and having at least one amino group or hydroxyl group capable of forming the said amide, imide, salt or ester. The high molecular weight acid is one having in the range of about 40 to 250 carbon atoms and includes unsubstituted and substituted monocarboxylic and polycarboxylic acids.

Monocarboxylic acids for use in the present invention will have molecular weights in the range of about 600 to 4000, preferably from about 700 to 3000. Such acids can be prepared by oxidizing high molecular weight olefins, e.g., polyisobutylene of about 900 molecular weight, with an oxidizing agent such as nitric acid or oxygen, by addition of an aldehyde to an olefin followed by oxidization of the adducts, or by addition of halogen to a high molecular weight olefin to form a dihalogen compound followed by hydrolyzing oxidation of the latter. These procedures are taught in British Patent No. 983,040.

A suitable monocarboxylic acid or derivative thereof can also be obtained by oxidizing a monohydric alcohol with potassium permanganate or by reacting a halogenated high molecular olefin polymer with a ketene. Another convenient method for preparing a monocarboxylic acid involves the reaction of metallic sodium with an acetoacetic ester of a malonic ester of an alkanol to form a sodium derivative of the ester and the subsequent reaction of the sodium derivative with a halogenated high molecular weight hydrocarbon such as brominated wax or brominated polyisobutylene.

Monocarboxylic acds may also be prepared from olefin polymers such as a polymer of a $C_2$ to $C_5$ monoolefin, e.g., polypropylene or polyisobutene by halogenating the polyolefin and then condensing it with an unsaturated monocarboxylic acid. Examples of suitable olefin polymers include polyethylene, polypropylene, or polyisobutylene, having an average molecular weight of about 600 to 3000, preferably about 800 to 1900. Such polymers have from about 40 to 250 carbon atoms, or more preferably, about 50 to 120 carbon atoms per molecule. Polyisobutylene is preferred since it has a lessened tendency to gel the product, as compared to some of the other polyolefins such as polyethylene or polypropylene. The polymer is halogenated by contacting it with either bromine or chlorine, preferably by blowing chlorine through the polymer, to provide about one to two atoms of halogen per molecule of polymer. The halogenation step may be conducted in the temperature range of from about 50 to about 300° F. To aid in the halogenation step, the polymer may be dissolved in a suitable solvent, such as carbon tetrachloride, in order to lower the viscosity of the polymer. However, the use of such a solvent is not necessary.

The time required for halogenation may be varied to some extent by the rate at which the halogen is introduced. Ordinarily from about 2 to about 5 hours is a satisfactory halogenation period. In a representative plant scale operation involving the chlorination of polyisobutylene of 830 molecular weight, a 100-pound batch will be chlorinated with 10 pounds of chlorine introduced into the reactor over a period of 3½ hours with a chlorination temperature of about 250° F.

The halogenated polymer thus obtained is condensed with an alpha, beta-unsaturated, monocarboxylic acid of from 3 to 8 carbon atoms. Ordinarily, because of their greater availability, acids of this class having 3 or 4 carbon atoms will be used. Such acids include acrylic acid, alpha-methyl-acrylic acid (i.e., 2 - methyl propenoic acid) crotonic or isocrotonic acid, tiglic acid, angelic acid, sorbic acid and cinnamic acid.

In condensing the halogenated polyolefin with the unsaturated acid, at least one mole of acid is used per mole of halogenated polyolefin. Normally, the acid will be employed in excess and may amount to as much as 1.5 to 2 moles per mole of halogenated polyolefin. The condensation temperature may be in the range of from about 300 to 500° F. and will more preferably be within the range of from about 375 to 475° F. The condensation may require from about 3 to about 24 hours, but will ordinarily take place in from 6 to 18 hours. After the reaction has been completed, excess acid may be purged from the mixture, for example, by blowing with a stream of nitrogen at a temperature of 400 to 500° F.

High molecular weight carboxylic olefin acids of this type can also be prepared by a so-called one-step process involving the halogenation of the olefin polymer in the presence of the alpha, beta-unsaturated acid. Using proportions of reactants within the ranges discussed above, the starting acid and the olefin polymer are mixed together in the reactor, the temperature being kept below about 150° F. until the start of halogen introduction so as to avoid homopolymerization of the alpha, beta-unsaturated acid. Once halogenation has begun, the temperature may be raised to as high as 250° F. After halogen introduction the temperature may be raised to 300 to 500° F. to effect the condensation reaction.

A polycarboxylic acid for use in the invention may be prepared by halogenating a high molecular weight hydrocarbon such as the olefin polymer described herein above to produce a poly-halogenated product, converting the poly-halogenated product to a poly-nitrile, and then hydrolyzing the poly-nitrile. Polycarboxylic acids may be prepared also by oxidation of a high molecular weight polyhydric alcohol with potassium permanganate, nitric acid, or a like oxidizing agent. Another method for preparing such polycarboxylic acids involves the reaction of an olefin or a polar-substituted hydrocarbon such as a chloro-polyisobutylene with an unsaturated poly-carboxylic acid such as 2-pentene-1,3,5-tricarboxylic acid obtained by dehydration of citric acid.

A particularly useful polycarboxylic acid is an aliphatic-hydrocarbon-substituted succinic acid or anhydride. The preparation of an alkenyl succinic anhydride is well-known in the art and simply involves reacting maleic anhydride with an organic compound having an olefinic linkage. Generally, about equal molar proportions of maleic anhydride and the olefinic material are simply heated together. In some cases somewhat of an excess of olefinic material may be used; also in some instances catalysts may be employed in the reaction. The particular mode of preparing the alkenyl succinic anhydride is not the concern of the present invention.

The alkenyl succinic anhydrides may be represented by the following formula:

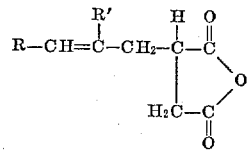

In the above formula R and R′ can be either hydrogen or hydrocarbon radicals but at least one of them must be a hydrocarbon group. The hydrocarbon radicals may be either substituted, as for example chlorinated or sulfurized, or they may be unsubstituted and they will include aliphatic, acyclic and aromatic radicals. Preferably, the total number of carbon atoms in R and R′ combined is within the range of from about 40 to 250, more preferably within the range of from about 50 to about 120. Particularly desirable for use in this invention because of low cost and ready availability are alkenyl groups obtained by polymerizing a $C_2$ to $C_5$ monoolefin to a polymer having a molecular weight within the range of from about 500 to about 3500. More specifically, the alkenyl group may be derived from polypropylene or polyisobutylene of about 700 to 1700 molecular weight.

Substituted acids can also be used in making the dispersant. For example, keto acids can be prepared by condensing alkylated aryl compounds with dibasic acids, e.g., maleic acid or succinic acid, dibasic acid anhydrides, e.g., phthalic anhydride, or dibasic aryl halides, e.g., adipic acid chloride, in the presence of a Friedel-Crafts catalyst, such dibasic acid compounds having a total carbon content in the range of from 4 to 20 carbon atoms. The alkylated aryl compounds include alkylated aromatic hydrocarbons such as alkylated benzenes, naphthalenes and anthracenes and alkylated phenols having from 1 to 6 carbon atoms in the alkyl chain. These keto acids are characterized by the following general formula:

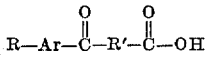

In the above formula R′ is a hydrocarbon radical having in the range of from 2 to about 18 carbon atoms, preferably from about 2 to 6 carbon atoms, and the symbol Ar is an aromatic radical having in the range of 6 to 16 carbon atoms. The symbol R in the above formula is at least one aliphatic hydrocarbon radical having in the range of from 12 to 30 carbon atoms, which can be derived by alkylating the aromatic compound, e.g., benzene, phenol, naphthalene, etc., with halogenated paraffin wax, chlorinated gas oil, brominated cetane, etc.

When the dispersant used in this invention is an amide, imide or salt of an amine and a carboxylic acid it is preferred that the amine be a polyamine such as diethylene triamine, tetraethylene pentamine, octaethylene nonamine, tetrapropylene pentamine, and N,N-di-(2-aminoethyl)-ethylene diamine. The polyamine may be represented by the general formula $$NH_2(CH_2)_n—[NH(CH_2)_n]_m—NH_2$$

wherein n is 2 to 3 and m is a number from 0 to 10.

The use of N-aminoalkyl piperazines, mixtures of different alkylene polyamines, mixtures of different N-aminoalkyl piperazines, and mixtures of N-aminoalkyl piperazines with alkylene polyamines is also within the scope of this invention.

Ester-type dispersants used in this invention include not only the N-alkyl-morpholinone esters previously mentioned but also esters of other hydroxy alkyl nitrogen-containing compounds, e.g., N-(2-hydroxyethyl) ethylene diamine, 1,4-bis(2-hydroxypropyl) piperazine, N,N′-bis (2-hydroxyethyl) ethylene diamine, and dihydroxypropyl-substituted tetraethylene pentamine. Particularly useful are the polyhydroxy alkyl tertiary amines, e.g., N,N,N′,N′ tetrakis (hydroxyalkyl) alkylene diamines, which may also be referred to as alkylene dinitrilotetraalkanols. These may be represented by the following general formula:

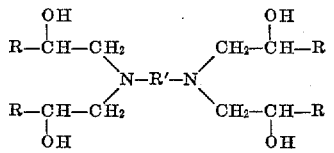

where R is a member selected from the group consisting of hydrogen atoms and alkyl groups containing 1 to 2 carbon atoms, and R′ is an alkylene radical of from 2 to 6 carbon atoms. Some of the hydroxyalkyl alkylene diamines are available commercially. Specific examples of these compounds include ethylene dinitrilotetraethanol, propylene dinitrilotetrabutanol and ethylene dinitrilotetrapropanol.

The above hydroxyalkyl alkylene diamines may be prepared by reacting an alkylene oxide containing 2 to 4 carbon atoms with an alkylene diamine such as ethylene diamine, propylene diamine, or hexamethylene diamine. In this reaction, about 4 moles of the alkylene oxide will be reacted with each mole of alkylene diamine. If the molar proportions are changed, other polyhydroxy alkyl amines useful in this invention are obtained, such as the following:

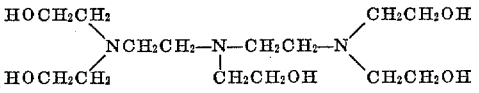

Any of the aforesaid monocarboxylic or polycarboxylic acids can be reacted with any of the aforesaid amines, polyamines or nitrogen-containing hydroxy compounds. Thus, one type of dispersant is prepared by reaction of an alkenyl succinic anhydride with a polyamine under conditions evolving water of reaction; using from 0.5 to 4.0 moles of the anhydride per mole of polyamine. Generally, in preparing any of the reaction products of the polyamines with monocarboxylic acids or polycarboxylic acids it is desirable to use sufficient of the acid to react with at least one amino group per molecule of polyamine, and the amount of acid used may even exceed the amount that is sufficient to react with every amino group in the polyamine molecule. There is usually no advantage in using less than one-half equivalent of the polyamine per equivalent of carboxylic acid. With respect to this notation, the number of equivalents in the polyamine depends upon the number of amino groups present; thus, tetraethylene pentamine has 5 equivalents. Similarly, an alkenyl succinic acid or anhydride has two equivalents, and a monocarboxylic acid has one equivalent.

As stated above, in addition to the dispersants prepared by reacting alkenyl succinic anhydrides with polyamines, another type of dispersant that can be employed in the present invention is prepared by reaction of an alkenyl succinic anhydride with a polyamine and a carboxylic acid. One method of preparing such an additive involves a two-stage process wherein the first stage is the reaction of a carboxylic acid with a polyamine to form an imidazoline which is then condensed with the alkenyl succinic anhydride in a second stage. The carboxylic acid employed is one having from 1 to 30 carbon atoms in an aliphatic hydrocarbon chain and is preferably a carboxylic acid having from 1 to 18 carbon atoms. The aliphatic chain may be either branched or straight chain and either saturated or unsaturated. The acids may be either monocarboxylic or dicarboxylic and include acetic, fumaric, adipic, lauric, oleic, linoleic, and stearic acids. Additives of this type can also be prepared more simply by simultaneously reacting the carboxylic acid, the polyamine, and the alkenyl succinic anhydride.

An additional type of dispersant that is useful in the present invention is obtained by further reacting the reaction product of an alkenyl succinic anhydride, a carboxylic acid, and a polyamine with an acidic organic compound containing phosphorus and sulfur. More specifically, an acidic organic compound is employed from the class consisting of phosphosulfurized hydrocarbons and dialkyl dithiophosphoric acids.

Imidazolines can be prepared by simple mixing of substantially stoichiometric proportions of a polyamine and a carboxylic acid followed by heating to reflux and removal of the water of condensation. To aid in removing the water of reaction an inert solvent such as heptane or toluene can be used as a water entraining agent. The solvent can then be removed later by evaporation. The imidazoline thus formed can then be reacted with the alkenyl succinic anhydride. The reaction is preferably carried out with equal molar proportions of the two reactants, the reaction being conducted by heating to reflux temperature and removing the water of condensation. As in the first stage, an inert solvent can be used to aid in removing water.

In an improved method of preparing reaction products of alkenyl succinic anhydrides, carboxylic acids and polyamines equimolar proportions of the alkenyl succinic anhydride, the polyamine and the carboxylic acid may be reacted together. However, variation in these relative proportions can be made, for example, 0.5 to 4.0, preferably 0.5 to 1.5 moles of the anhydride and 0.5 to 4.0, preferably 0.5 to 1.5 moles of the carboxylic acid can be used per mole of polyamine.

While generally in any of the reactions involving an alkenyl succinic anhydride and a polyamine or any of the modifications discussed above, the reactants upon simple mixing will interact to some extent, the products will generally be oil-insoluble. However, upon heating (e.g., to about 200 to 250° F.) the reaction mixture will become mineral-oil-soluble, and upon continued heating condensation reactions will begin to take place with the evolution of water. The evolved water can be readily removed by blowing nitrogen or other nonreactive gas through the reaction mixture during the course of the reaction. The reaction may be carried out by heating the three reactants for about 1 to 30 hours at 250 to 350° F. Preferred reaction conditions include heating for 6 to 20 hours at 275 to 300° F. Preformed alkenyl succinic anhydride can be used, or the alkenyl succinic anhydride can be made by first reacting the olefinic material with the maleic anhydride to form the alkenyl succinic anhydride, thereafter adding the polyamine (and the carboxylic acid when it is used in the reaction) to the hot alkenyl succinic anhydride, and then preferably further heating to form a condensation product. Preferably, a light mineral oil is added to the reaction mixture as a diluent after the formation of the alkenyl succinic anhydride and before the addition of the polyamine or the polyamine plus fatty acid. An antifoamant agent such as a polysilicone can be added to the reaction mixture in order to prevent foaming during the addition of the amine.

Also contemplated for use in this invention are dispersants prepared by reacting an alkenyl succinic acid or anhydride with a polyhydric alcohol or an alkanolamine and subsequently with a polyamine in accordance with the procedure taught in U.S. Patent No. 3,184,474. In preparing these dispersant additives, the polyamines and the alkenyl succinic anhydrides are of the same nature as disclosed above. The polyhydric alcohols include alkylene glycols, such as ethylene glycol, propylene glycol, butanediol-1,4 pentanediol-1,5, octylene glycol, and polyalkylene glycols, such as polyethyylene glycols and polypropylene glycols. The alkanolamines include triethanolamine and diethanolamine. In general, the polyhydric alcohols and alkanolamines contain in the range of from 2 to 36, and preferably from 4 to 18, carbon atoms. While equimolar proportions of each of the three reactants are normally used, from 0.75 to 2.0 molar proportions of the polyhydric alcohol or alkanolamine and from 0.75 to 2.1 molar proportions of the polyamine can be used for each molar proportion of the alkenyl succinic anhydride. In preparing the additive the polyhydric alcohol or alkanolamine and the alkenyl succinic anhydride are refluxed together for from 1 to 24 hours, after which the polyamine is added and refluxing is continued for 1 to 24 hours, while removing water of condensation.

When preparing a dispersant by condensing a keto acid with a polyalkylene polyamine conditions are used to favor the formation of amides with the carboxyl groups of the keto acids, although some of the product may contain Schiff base derivatives resulting from reaction with the keto groups. One or more of the amino groups of the polyamine may enter into either the amide-forming reaction or the Schiff base forming reaction. Generally, the mole ratio of polymaine to keto acid will range from about 1:5 to about 3:1 although it is preferred that this ratio be in the range of from about ½ mole of polyamine per carboxylic acid group up to about 2 moles of polyamine per carboxylic acid group. The reaction temperatures for amide formation will generally be in the range from about 200 to 400° F.; in most cases, however, a narrower range of from about 250 to about 350° F. will be used. The reaction time will depend to some extent upon the reaction temperature. The composition of the reaction can be determined by measuring the amount of water that is split off during the reaction. If desired, a water entraining solvent such as heptane or toluene can be employed to remove the water as an azeotrope.

Similar reaction conditions are used in preparing amides of the other monocarboxylic acids disclosed above. For example, polyisobutenyl propionic acid may be reacted with triethylene tetramine by heating for 6 to 20 hours at 275 to 320° F.

The metal component of the metal salts of this invention may be one of a number of light or heavy metals, mono or polyvalent. While the alkali metal or alkaline earth metals are particularly advantageous other metals can be used as well. The former include sodium, potassium, lithium, calcium, barium strontium and magnesium. Other specific metals include zinc, cadmium, mercury, lead, tin, iron, cobalt, copper, manganese, aluminum, chromium, nickel, antimony, etc.

These metals are usually employed in the invention in the form of basic compounds, including oxides, hydroxides and hydrated oxides or hydrated hydroxides.

The acidic gases usable in the invention include HCl, $SO_2$, $SO_3$, $CO_2$, air (considered acidic because of $CO_2$ content), $NO_2$, $BF_3$, $H_2S$, etc. Most generally $H_2S$, $SO_2$ or $CO_2$ will be used. In most instances carbonate salts are advantageously employed in the dispersion of the invention.

While the colloidal dispersions could be prepared in the dispersant material per se, it is usually more convenient to prepare them in a mixture of dispersant and oil, thus providing an additive concentrate for further use.

In preparing colloidal metal salt dispersions in an oleaginous medium there are at least three factors that must be considered. One of these is to obtain good contact between the metal base and the acidic gas, e.g., carbon dioxide. This requires that at least some polar material, usually water, be present to solubilize, totally or in part, the metal base, e.g., oxide or hydroxide. Another factor is to condition the polar phase so as to facilitate transfer of the formed metal carbonate into the oil phase. A third factor is to stabilize the metal salt dispersion or sol. The latter is accomplished by the dispersant additives discussed above.

To facilitate transfer of the metal salt across the interface between the polar phase and the oil phase, auxiliary dispersants, surface active materials ar promoters may be employed. Promoters include such materials as alcohols, alkylphenols, for example, amylphenol, octylphenol, or nonylphenol, carboxylic acids such as benzoic acid, oleic acid, tall oil fatty acids, or the like, various amino compounds such as isopropanolamine, ethylene diamine, diethylene-triamine, or the like. Other promoters are listed in U.S. Patent Nos. 2,856,360; 2,695,910; 2,777,874; etc.

While the exact function of the promoter is not known. all of the promoters that have been found to be effective are characterized by having a hydrophilic portion, e.g., an OH or a $NH_2$ group and an oleophilic portion which is usually a hydrocarbon group. One theory is that the promoter bridges the polar phase where the reaction occurs and the hydrocarbon phase in which the resulting salt is subsequently dispersed.

To ensure the fineness of particle size that is necessary to obtain the colloidal dispersions, high speed mixing may be employed, or a technique may be used which involves the preparation of a microemulsion, adding the metal base, usually an alkali metal or alkaline earth hydroxide to the microemulsion, treating the mixture with the acidic gas, such as carbon dioxide, and then stripping off the water. The microemulsion technique involves the formation of an emulsion wherein the droplets in the disperse phase are at least smaller than 400 A. so that the emulsion is clear or at the most only very slightly hazy. To form a microemulsion, water or a $C_1$ to $C_3$ aliphatic alcohol is dispersed in a liquid hydrocarbon containing a balanced mixture of dispersants comprising carboxylic acids and alkanolamines.

A microemulsion may be prepared at ambient temperatures. The addition of the metal base is preferably conducted after the microemulsion has been heated at an elevated temperature (100 to 250° F.; more usually 125 to 200° F.) and the treatment with $CO_2$ or other acidic gas is also preferably conducted at an elevated temperature (125 to 300° F.; more usually to 175 to 250° F.). Water can be removed from the product by sparging with an inert gas such as nitrogen at temperatures in the range of 200 to 400° F., more generally 275 to 325° F. The rate of $CO_2$ flow at the start of the $CO_2$ treatment should preferably not exceed that rate at which the $CO_2$ content of the exit gas indicates a 25 to 50% loss of unreacted $CO_2$. That flow rate is then held constant until the exit gas indicates that loss of unreacted $CO_2$ exceeds about 90%. Normal reaction times are about 1.5 to 2.5 hours.

In preparing additives of the present invention by the high speed stirring technique, a solution or blend of the dispersant, e.g., alkenyl succinic anhydride derivative, and any promoter or auxiliary agents that are to be used, is prepared in a hydrocarbon oil, using heat and stirring if necessary to effect the solution or blending. The hydrocarbon oil may comprise any fraction that has a sufficiently high boiling point so that it will not vaporize under the reaction conditions. Light lubricating oil fractions are particularly suitable. The solution or blend is then subjected to high speed stirring while the desired base, usually metal oxide or hydroxide is added gradually and simultaneously with the introduction of a stream of acidic gas such as carbon dioxide. If water is needed in the reaction it is either added initially or it may be added dropwise along with the metal base, e.g., oxide or hydroxide. At the end of the reaction period the product is dehydrated and filtered. The broad and preferred temperature ranges for the steps are given in Table I.

TABLE I

| Step | Temperature range, ° F. | |
|---|---|---|
| | Broad | Preferred |
| Blend dispersant, e.g., alkenyl succinic acid derivative, promoter, e.g., alkylphenol, auxiliary ingredients and oil | 30–200 | Ambient |
| Add metal base, e.g., oxide and/or hydroxide $+CO_2$ and/or other acidic gas | 50–400 | 150–280 |
| Dehydrate | 200–400 | 275–325 |
| Filter | 100–400 | 225–325 |

The time required for addition of the metal base may range from about 30 minutes to about 6 hours, and will more generally range from about 1 to 3 hours. The dehydrating step may require from 15 minutes to about 45 minutes.

The proportions of reacting materials may vary within the ranges shown in Table II.

TABLE II

| | Weight percent | |
|---|---|---|
| | Broad | Preferred |
| Alkenyl succinic acid derivative or other dispersant | 5–35 | 15–25 |
| Alkylated phenol and auxiliary agents | 1–15 | 2–7 |
| Water [1] | 0–10 | 0.1–1.5 |
| Metal oxide (or equivalent metal base, e.g., hydroxide) | 10–50 | 20–40 |
| Diluent oil | 20–80 | 40–60 |

[1] Ordinarily not needed if metal base is hydrated hydroxide such as $Ba(OH)_2 \cdot 5H_2O$.

The dispersions prepared in accordance with this invention are additive concentrates containing in the range of 5 to 50% dispersant materials and from 0 to 35% metal salt, e.g., sulfide, nitrite, carbonate, etc. Normally, although not necessarily, mineral oil diluent will be present as a third component of the dispersion. These concentrates may be added to any of several types of oil compositions ranging from fuel oils through lubricating oils. The lubricating oils to which they may be added include mineral lubricating oils and synthetic oils. The mineral lubricating oils include those derived from paraffinic, naphthenic, asphaltic, or mixed base crude oils. Synthetic hydrocarbon lubricating oils may also be employed. Other synthetic oils include dibasic acid esters such as di-2-ethyl hexyl sebacate, carbonate esters, polysilicones, halogenated hydrocarbons, phosphate esters, polyglycols, glycol esters such as $C_{13}$ oxo acid diesters of tetraethylene glycol, and complex esters, e.g., one formed by reaction of 1 mole of sebacic acid with 2 moles of tetraethylene glycol and 2 moles of 2-ethyl hexanoic acid.

For lubricating oil compositions the concentrates may be added in amounts ranging from about 0.1 to about 10 weight percent, to furnish from about 0.01 to about 3 weight percent of metal, depending upon the particular use. For example, in crankcase lubricants concentrations providing from about 0.02 to about 0.6 weight percent of metal are advantageous, while for marine diesel lubrication concentrations providing as much as 1.5 to 2 weight percent of a metal such as calcium might be used.

The additives of this invention may also be employed in middle distillate fuels for inhibiting corrosion and the formation of sludge and sediment in such fuels. Concentration ranges of from about 0.002 to about 2 weight percent, or more generally from about 0.005 to about 0.2 weight percent, are employed. These additives may also be used in conjunction with ashless additives for fuels, such as polymers of acrylic or methacrylic acid esters, high molecular weight aliphatic amines, etc. Petroleum distillate fuels boiling in the range of from about 300° to about 900° F. are contemplated. Typical of such fuels are No. 1 and No. 2 fuel oils that meet ASTM Specification D–396–48T, diesel fuels qualifying as Grades 1D, 2D, and 4D of ASTM Specification D–975–51T, and various jet engine fuels.

The additives may also be used in residual fuels. Magnesium compounds are of particular value for addition to residual fuel oils containing vanadium compounds. The latter are objectionable because the ash tends to be corrosive to metal parts exposed to high temperatures. Magnesium compounds combat this corrosion. For this use sufficient of the colloidal dispersion of $MgCO_3$, for example, will be added to furnish from 0.5 to 4.5 parts of magnesium per part of vanadium. The total amount needed will of course depend on the vanadium content of the fuel oil, which may range anywhere from 5 to 1000 parts per million, for example. Magnesium carbonate dispersions may also be useful in fuel oils to reduce corrosion caused by sulfur, as by preventing or suppressing sulfur trioxide formation.

In either the fuel or lubricant compositions, other conventional additives may also be present including dyes, pour point depressants, antiwear agents, such as tricresyl phosphate or zinc dialkyl dithiophosphate of 3 to 8 carbon atoms, antioxidants such as phenyl-alpha-naphthylamine, tert. octylphenol sulfide, bis-phenols such as 4,4′-methylene bis (2,6-di tert. butylphenol), viscosity index improvers such as polymethylacrylates, polyisobutylene, alkyl fumarate-vinyl acetate copolymers, and the like, as well as other dispersants.

The dispersant-detergent additives of the invention may be used as the sole dispersant-detergent additives in lubricant composition or they may be used to enhance the dispersancy-detergency of lubricants containing conventional detergents, wherein the latter are used in concentrations in the range of about 0.5 to 5 weight percent. Such detergents or combination detergent-inhibitors include the alkaline earth metal salts of alkylated phenols or of alkylated phenol sulfides, as for example barium-calcium nonyl phenol sulfide, calcium petroleum sulfonate barium $C_{16}$ alkyl benzene sulfonate, and the so-called "overbased" or "high alkalinity" alkaline earth metal sulfonates.

The dispersant-detergents of this invention may also be used in conjunction with ashless detergents or dispersants, as for example high molecular weight polymeric multifunctional dispersants made with one or more polar moonmers, such as vinyl acetate, vinyl pyrrolidone, methacrylates, fumarates, maleates. These dispersants have molecular weights in the range of about 500 to 50,000. One example is a copolymer of 65 to 85 weight percent of mixed $C_9$–$C_{12}$ fumarates, 10 to 20 weight percent of vinyl acetate, and 5 to 15 weight percent of N-vinyl pyrrolidone. Another example is the copolymer derived by reaction of mixed tallow fumarates and $C_8$ oxo fumarates, averaging about 420 molecular weight, with vinyl acetate in a 3 to 1 acetate-fumarate ratio, and 3 weight percent of maleic anhydride, followed by subsequent removal of excess vinyl acetate. By tallow fumarates is meant the esters of fumaric acid and the alcohols derived by hydrogenation of tallow. The latter are principally $C_{16}$ and $C_{18}$ alcohols with minor amounts of $C_{12}$, $C_{14}$ and $C_{20}$ alcohols. $C_3$ oxo alcohols are prepared by reaction of carbon monoxide and hydrogen on mixed $C_3$ and $C_4$ olefins followed by hydrogenation of the resulting aldehydes.

The following examples show the preparation of dispersants useful in this invention.

PREPARATION OF DISPERSANT A

A mixture of 180 pounds (0.180 pound mole) of polyisobutylene of about 80 molecular weight and 22.5 pounds (0.230 pound mole) of maleic anhydride was heated for 24 hours at 450° F. under a nitrogen blanket to form polyisobutenyl succinic anhydride. The product was found to have a saponification number of 86.6 mg. KOH/gm. of reaction mixture. A light mineral lubricating oil having a viscosity of 150 SUS at 100° F. was added as a diluent in sufficient quantity to result in a solution containing 75 weight percent of the polyisobutenyl succinic anhydride. Then 30 p.p.m. of Dow Corning 60,000 cs. polymethyl silicone was added as an antifoamant. Next, 17.22 pounds (0.091 pound mole) of tetraethylene pentamine and 5.46 pounds (0.091 pound mole) of acetic acid were added. The reaction mixture was then heated at 300° F. for 10.5 hours while nitrogen was blown through it until no more water came off. The reaction product concentrate, after filtration, contained 2.22 weight percent nitrogen based on the total product, i.e., the actual reaction product and oil diluent. This concentrate is referred to later as Dispersant A.

PREPARATION OF DISPERSANT B

A mixture of 240 pounds of polyisobutylene of 1100 molecular weight (Staudinger), and 24 pounds of maleic anhydride was heated at a temperature of about 485° F. for about 24 hours. The heated mixture was then cooled to about 212° F., diluted with about 20 gallons of heptane, and filtered through Hyflo filter aid using a Sparkler filter. Then the heptane was evaporated by blowing nitrogen through the filtrate while heating at about 310° F. The heptane had been used simply to reduce the viscosity of the reaction product to permit easier filtering. The recovered alkenyl succinic anhydride reaction product was a viscous material of amber color, and had a saponification number of 63.6 gm. KOH/gm. of reaction product.

A mixture of 200 grams of the product alkenyl succinic anhydride thus prepared, 19.2 grams of tetraethylene glycol and 50 grams of toluene as a water-entraining agent was heated to reflux at 280° F. for 3 hours in a reaction flask equipped with a Dean-Stark trap. Then 24.2 grams of tetraethylenepentamine was added to the reaction flask and reflux was continued at 280° F. for about two more hours until two ml. of water had collected in the Dean-Stark trap. The composition was then stripped of the toluene by nitrogen blowing on a steam bath, which took about 12 hours. The residue was then cooled, and for convenience in handling, an oil solution was made up by dissolving 75 weight percent of the product in 25 weight percent of a light mineral lubricating oil. The resulting dispersant concentrate is hereafter referred to as Dispersant B.

PREPARATION OF DISPERSANT C

Mixed dialkyldithiophosphoric acids were prepared by reacting a mixture of 35 weight percent of primary amyl alcohols and 65 weight percent of isobutyl alcohol with phosphorous pentasulfide using a mole ratio of alcohol to $P_2S_5$ of 4 to 1. The reaction was conducted at about 170° F. for a period of about 4 hours until a specific gravity of about 1.05 was attained, measured at 78° F. The reaction product was then stripped of hydrogen sulfide with the aid of a stream of nitrogen, the product being cooled to about 90° to 100° F., and the product was then filtered.

A mixture of 1200 parts by weight of Dispersant A (product concentrate) 133 parts by weight of a phosphosulfurized hydrocarbon concentrate, and 256 parts by weight of the dialkyldithiophosphoric acids prepared as just described, was heated at 212° F. for 1 hour, with a stream of nitrogen bubbling beneath the surface of the mixture. The product was a very viscous, oil-soluble material. It was diluted with 1589 parts by weight of solvent neutral mineral oil (150 SSU viscosity at 100° F.), giving a 50 weight percent additive concentrate, hereinafter referred to as Dispersant C. The phosphosulfurized hydrocarbon concentrate employed consisted of 30 weight percent of light mineral oil and 70 weight percent of the product obtained by reacting 100 parts by weight of polyisobutylene of 940 average molecular weight with 15 parts by weight of $P_2S_5$ at 425 to 450° F. for 8 hours. The phosphosulfurized polyisobutylene analyzed about 3.5 weight percent of phosphorous and about 6.6 weight percent of sulfur.

PREPARATION OF DISPERSANT D

A 110-pound portion of polyisobutylene of 780 molecular weight was heated to 250° F., then a stream of chlorine was passed through the heated polyisobutylene at the 250° F. temperature at a rate of 2.5 pounds of chlorine per hour for a total of 4 hours, to total chlorine treat thus being 10 pounds. A sample of the chlorinated product analyzed 4.3% chlorine and the product had an API gravity of 23.3. To the chlorinated polyisobutylene there was added 10.5 pounds of acrylic acid. Over a period of two hours the temperature was raised from 250° F. to 425° F. and the pressure was increased to 20 p.s.i.g. Heating was continued for 5 hours at 425° F. and the reaction vessel was vented to maintain the pressure of 20 p.s.i.g. The pressure was then released and the mixture was purged with nitrogen for 2 hours to remove unreacted acrylic acid. The polyisobutenyl propionic acid thereby obtained at the end of the reaction weighed 109.3 pounds and had a total neutralization number (ASTM D–664) of 46.2 milligrams of KOH per gram. The chlorine content was found to be 0.3 weight percent.

70-pound portion of the polyisobutenyl propionic acid obtained as just described was mixed with 31.5 pounds of a solvent neutral mineral lubricating oil (150 SSU at 100° F.) and the resulting mixture was reacted with 3.38 pounds of tetraethylenepentamine at 300° F. for 9 hours, the mixture being maintained at reduced pressure (28 inches of vacuum) and purged with a stream of nitrogen during the 9-hour reaction period to remove water as it was formed. The reaction mixture was then filtered through diatomaceous earth. The product analyzed 1.2 weight percent nitrogen and was in the form of a concentrate containing about 70 weight percent of reaction product and 30 weight percent of diluent mineral oil. Yield of product was 98.5 pounds.

PREPARATION OF DISPERSANT E

Polyisobutenyl succinic anhydride of about 1000 molecular weight prepared from polyisobutylene and maleic anhydride is reacted with tetraethylene pentamine in the proportion of 3 moles of the anhydride to 1 mole of the pentamine, the two reactants being mixed together at about 160° F. and then heated to 275° F., the latter temperature being maintained for a period of about 6 hours while bubbling a stream of nitrogen beneath the liquid surface of the mixture. At the end of the 6 hours, sufficient solvent neutral mineral oil (150 SUS at 100° F.) is added to give a 75 weight percent concentrate of reaction product.

When preparing metal salt dispersions in accordance with the invention, numerous variations in the processing are possible. The following processes were found particularly effective using an alkali metal or alkaline earth metal base, $CO_2$ as the acidic gas, a succinic acid derivative as the dispersant, and alkyl phenol as the promoter.

Example 1

A mixture of 1000 grams of the additive concentrate Dispersant A (75% active ingredient), 502 grams of nonylphenol, and 3825 grams of a solvent refined mineral lubricating oil having a viscosity of 150 SUS at 100° F. was prepared by simple mixing at ambient temperature. After the mixture was heated to 265 to 275° F., 3600 grams of barium hydroxide pentahydrate was added over a period of 90 minutes while the mixture was subjected to high speed stirring in an "Eppenbach Homo-Mixer" supplied by Gifford Wood Co., Hudson, N.Y. During the addition of the barium hydroxide, 12.03 cubic feet of carbon dioxide was sparged into the mixture. This amount of carbon dioxide represents 110% of the equivalent amount of barium. Then the mixture was heated to 300° F. and kept at this temperature for 30 minutes after which it was filtered with filter aid (Dicalite) yielding a reddish brown viscous liquid. The yield of additive amounted to 95% of theoretical. The calculated product composition is shown in Table III.

TABLE III

| Component: | Weight percent, active ingredient basis |
|---|---|
| Dispersant A | 10 |
| Nonylphenol | 7 |
| Barium carbonate | 32 |
| Diluent oil | 52 |

The detergent-dispersant prepared in Example 1 can be compared with a representative commercial detergent inhibitor concentrate comprising a barium carbonate dispersion prepared in the presence of an alkyl phenol and a phosphosulfurized hydrocarbon, i.e., by reacting a mixture of phosphosulfurized polyisobutylene and nonylphenol with $Ba(OH)_2 \cdot 5H_2O$ and carbon dioxide. The approximate analysis of the concentrate is 27 weight percent of phosphosulfurized polyisobutylene, 11.7 weight percent nonyl phenol, 13.1 weight percent barium carbonate and 48.2 weight percent mineral oil. The concentration of organic constituents (other than diluent oil) in the concentrate of Example 1 is less than half that of the commercial material and yet the barium carbonate concentration in the Example 1 concentrate is about 2.5 times that of the commercial material.

Example 2

Example 1 was repeated, using the same procedure and the same amount of Dispersant A concentrate (1000 grams) but employing less alkyl phenol (462 grams), less barium hydroxide pentahydrate (2415 grams), and proportionately more mineral oil diluent, i.e., 4320 grams instead of 3825 grams. Proportionately less $CO_2$ was also used, and the time for addition of barium hydroxide addition and $CO_2$ treating was reduced to 60 minutes. The product had a barium carbonate content of about 23 weight percent and a diluent oil content of about 60 weight percent.

Example 3

A microemulsion technique was employed to prepare a calcium carbonate dispersion using the following procedure. By the use of simple mixing at room temperature, 400 grams of the concentrate (Dispersant A) (300 grams of active material), 30 grams of tall oil fatty acids, 15 grams of isopropanolamine, and 15 grams of diethylenetriamine were dissolved in 500 grams of a solvent refined neutral mineral oil having 150 seconds Saybolt viscosity at 100° F. To this mixture, 15 grams of water was added with stirring to form a clear microemulsion. The microemulsion was heated to 160 to 170° F. and then 400 grams of calcium hydroxide was added with stirring, using a conventional paddle stirrer. The mixture was then heated to 210 to 215° F. and over a period of 2 hours, 60 grams carbon dioxide was bubbled through the mixture while the temperature was held at 210 to 215° F. Then nitrogen was sparged into the mixture, which was heated to a temperature of 300 to 320° F. and kept at that temperature for 30 minutes under continuous nitrogen sparging. Then the product was filtered with the aid of Dicalite filter aid giving a reddish-brown viscous liquid. The final product contained 7.5 weight percent calcium as calculated from sulfated ash determination.

In the above preparation the amount of calcium hydroxide used was about 130% in excess of the amount that is theoretically required to give an additive concentrate containing 7.5 weight percent calcium. In a second preparation using the same reactants in the same proportions but employing only 50% excess lime calculated on the same basis the additive concentrate that was obtained was found on analysis to contain 4.0 weight percent calcium.

Other examples include the following:

Example 4

The procedure of Example 2 is repeated, substituting 1000 grams of Dispersant B concentrate for the 1000 grams of Dispersant A concentrate and an equivalent amount of $SO_2$ for the $CO_2$.

Example 5

The procedure of Example 1 is repeated employing in place of Dispersant A, 1400 grams of Dispersant C concentrate and proportionately less mineral oil diluent, i.e., about 3400 grams.

Example 6

The procedure of Example 2 is repeated substituting 900 grams of Dispersant E concentrate for Dispersant A.

Example 7

Example 3 is repeated, using, in place of Dispersant A, a commercially available concentrate consisting of 25 weight percent of mineral lubricating oil and 75 weight percent of a succinimide having the formula

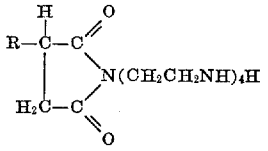

wherein R is a polyisobutenyl group of about 800 molecular weight.

Similar techniques can be used with other dispersants, acidic gases, metal bases, promoters, etc., previously mentioned.

Example 8

To a three gallon baffled vessel equipped with an efficient mixer there are charged: 455 grams of Dispersant D and 3850 grams of neutral mineral oil (150 SSU at 100° F.). The contents are heated with stirring to 260 to 280° F., and 354 grams of crude nonyl phenol (average molecular weight 251) is charged to the mix. Maintaining the temperature at 260 to 280° F., 1515 grams of sodium hydroxide as a 50% aqueous solution and 857 grams of $CO_2$ are charged simultaneously at a constant rate over a period of 120 minutes. Following this step the temperature of the neutralization mix is raised to 300° F., and the mix is soaked for 15 minutes. The raw neutralization mix at 300 to 310° F. plus 50 grams of filter aid is then filtered.

The following test results illustrate the utility and advantages of this invention.

Example 9

Using as the base oil a mineral lubricating oil having a viscosity of 325 SUS at 100° F. and a viscosity index of about 100, the following compositions were prepared:

Composition 1.—3.5 weight percent of a commercial detergent inhibitor, 0.9 weight percent of a zinc dialkyldithiophosphate antiwear additive, 95.6 weight percent of the base oil.

Composition 2.—2.0 weight percent of the concentrate product of Example 2, 1.07 weight percent of Dispersant A concentrate, 0.9 weight percent of a zinc dialkyldithiophosphate antiwear additive, 96.03 weight percent of the base oil.

Composition 3.—1.33 weight percent of the concentrate product of Example 3, 0.89 weight percent of Dispersant A, 0.9 weight percent of a zinc dialkyldithiophosphate antiwear additive, 96.88 weight percent of the base oil.

The commercial detergent inhibitor mentioned above was a mineral oil solution containing an additive prepared by reacting a mixture of phosphosulfurized polyisobutylene and nonyl phenol with barium hydroxide pentahydrate and blowing the reaction mixture with carbon dioxide. The approximate analysis of the concentrate was 27 weight percent of phosphosulfurized polyisobutylene, 11.7 weight percent nonyl phenol, 10.6 weight percent barium oxide, 2.5 weight percent carbon dioxide, and 48.2 weight percent of mineral oil.

The zinc dialkyldithiophosphate antiwear additive was an oil solution consisting of about 25 weight percent of mineral lubricating oil and about 75 weight percent of zinc dialkyldithiophosphate prepared by treating a mixture of isobutanol and mixed amyl alcohols with $P_2S_5$ followed by neutralizing with zinc oxide.

Each of the compositions 1 to 3 described above was tested for sludge dispersing ability in the ER 4–90 Ford sludging test. Prior experience has shown that this sludging test gives sludge deposits similar to those obtained in stop-and-go driving, such as would be experienced in taxicab operation. Briefly described, in this test a Ford 6-cylinder engine is run on a dynamometer stand through varying cycles consisting of a first cycle operating at 500 r.p.m. for 1½ hours, a second cycle operating at 2000 r.p.m. for 2 hours, and a third cycle also operating at 2000 r.p.m. for 2 hours but using slightly higher oil sump and water jacket temperatures. The three cycles are repeated over and over again in sequence until the desired total test time has elapsed. Make-up oil is added as required so that the crankcase oil level is maintained at all times between about 3½ and 4 quarts. After a selected test time has elapsed, the engine is inspected by disassembling it sufficiently to permit visual examination of the rocker arm cover, the rocker arm assembly, the cylinder head, the push rod chamber, the push rod chamber cover, the crankshaft, the oil pan, and the oil screen. The oil screen is rated as "percent covered with sludge" and the other parts are usually rated for sludge deposition using a merit system in which a numerical rating of 10 represents a perfectly clean part and 0 a part covered with the maximum amount of sludge possible. These individual merit ratings are then averaged to give an overall engine merit rating.

The results of the ER 4–90 test are summarized in Table IV. The duration of the test was 286 hours.

TABLE IV.—ER 4-90 ENGINE TEST RESULTS

| | Merit rating | Percent coverage oil screen |
|---|---|---|
| Composition 1 | 6.8 | 2 |
| Composition 2 | 9.3 | 0 |
| Composition 3 | 9.3 | 0 |

It will be seen that each of the compositions containing an additive of the present invention gave better performance than the composition containing the commercial detergent additive.

In summary, the present invention concerns the preparation of a colloidal dispersion of a metal salt, which dispersion can be referred to as an over-based detergent-dispersant, wherein said colloidal dispersion is prepared by forming the metal salt by reaction of a metal base with a normally gaseous acidic reactant in the presence of a nitrogen-containing ashless dispersant that is characterized as a nitrogen-containing derivative prepared from a high-molecular-weight carboxylic acid, i.e., a monocarboxylic or polycarboxylic acid having in the range of about 40 to 250 carbon atoms, and from a nitrogen compound having at least one reactive amino group or hydroxy group. All of these dispersants have a common characteristic; that is, all of them have a long chain, which is present in the carboxylic acid portion of the product, and all of them contain nitrogen either in the form of an amino group or a heterocyclic nitrogen atom. Typically, the nitrogen-containing portion of the dispersant is derived from an alkylene polyamine having from 2 to 12 nitrogen atoms and 2 to 33 carbon atoms and 1 to 4 hydroxy groups, or from an N-hydroxy alkyl morpholinone having a total carbon atom content within the range of about 6 to 30 carbon atoms, the hydroxy alkyl group having from 2 to 4 carbon atoms. The product of reaction between the high molecular weight carboxylic acid and the nitrogen compound is usually either an amide, an imide, or an ester, although it can be a simple amine salt.

The present invention is based on the discovery that the above-described nitrogen-containing dispersants, all of which are known to the art as lubricant additives, are outstandingly effective in their ability to maintain a colloidal dispersion of the metal salt that is prepared in situ in the presence of the dispersant so that a metal containing detergent-dispersant having an especially high ratio of metal to dispersant can be prepared. The results that are given in the foregoing examples are typical illustrations of the ability of these nitrogen-containing dispersants to accomplish the objects of the invention. The effectiveness of the nitrogen-containing dispersants to attain high ratios of metal to dispersant is demonstrated, for instance, by Example 1 of this specification wherein it was shown that it is possible to prepare a colloidal dispersion having a concentration of organic constituents less than half of a commercial material while at the same time having a concentration of metal salt about 2½ times that of the commercial material.

The dispersants employed in the present invention perform two functions; i.e., they maintain the colloidal dispersion and they also impart dispersency to the lubricating compositions to which the colloidal dispersion is added. At the same time, the colloidally dispersed metal salt contributes detergency to the composition.

While the lubricant compositions herein described are primarily designed as automotive crankcase lubricants, the additives of the invention may also be employed in other hydrocarbon oil compositions including turbine oils, various industrial oils, gear oils, hydraulic fluids, transmission fluids and the like.

It is to be understood that the examples presented herein are intended to be merely illustrative of the invention and not as limiting it in any manner; nor is the invention to be limited by any theory regarding its operability. The scope of the invention is to be determined by the appended claims.

What is claimed is:

1. A process for preparing an overbased detergent-dispersant for an oil composition which comprises reacting at a temperature in the range of from about 50 to about 400° F. a metal base with a normally gaseous acidic reactant, whereby a metal salt is formed, in the presence of a dispersant comprising the product of reacting a high molecular weight carboxylic acid, having in the range of about 40 to 250 carbon atoms, with an organic nitrogen-containing compound having at least one reactive amino group or hydroxy group, said dispersant being capable of colloidally suspending the said metal salt, said dispersant being selected from the class consisting of the amides, imides, and esters of said carboxylic acid, said organic nitrogen-containing amino compound being selected from the class consisting of alkylene polyamines, hydroxyalkyl amines and N-hydroxy alkyl morpholinones, the proportion of dispersant to metal base being in the range of from 5 to 35 parts by weight of dispersant to from 10 to [15] *50* parts by weight of said metal base.

2. Process as defined by claim 1 wherein said metal base is selected from the class consisting of alkali metal oxides, alkaline earth metal oxides, alkali metal hydroxides and alkaline earth metal hydroxides, and said acidic gas is carbon dioxide.

3. Process as defined by claim 1 wherein said reaction is conducted in a mineral oil solution of said dispersant.

4. Process as defined by claim 1 wherein said process is conducted in the presence of a promoter capable of assisting in the transfer of metal salts from a polar phase to an oil phase.

5. A mineral oil composition comprising a major proportion of a mineral oil selected from the class consisting of middle distillate fuels, residual fuels, and lubricating oils and from 0.001 to 10 weight percent of the product prepared by the process of claim 1.

6. The product prepared by the process of claim 1.

7. A mineral oil composition comprising a major proportion of a mineral oil selected from the class consisting of middle distillate fuels, residual fuels, and lubricating oils and sufficient of the additive of claim 6 to furnish in the composition from about 0.01 to 3 weight percent of metal.

8. A detergent-dispersant additive concentrate comprising from 5 to 50 weight percent of an oil-soluble dispersant and from 10 to 35 weight percent of a metal salt, said concentrate having been prepared by reacting at a temperature in the range of about 50 to about 400° F. a metal base with a normally gaseous acidic reactant, thereby forming said metal salt in the presence of said dispersant, said dispersant being selected from the class consisting of the amides, imides, and esters of a high molecular weight carboxylic acid having in the range of about 40 to 250 carbon atoms with an organic nitrogen compound having at least one reactive amino group or hydroxy group and being selected from the class consisting of alkylene polyamines, hydroxyalkyl amines and N-hydroxy alkyl morpholinones.

9. An overbased detergent-dispersant additive for an oil composition which comprises a colloidal dispersion of a metal salt of a normally gaseous inorganic acid colloidally suspended with a dispersant selected from the class consisting of the amides, imides, and esters of a high molecular weight carboxylic acid having in the range of about 40 to 250 carbon atoms and of an organic nitrogen-containing amino compound selected from the class consisting of alkylene polyamines, hydroxyalkyl amines and N-hydroxy alkyl morpholinones.

10. Additive as defined by claim 9 wherein the proportion of dispersant to metal salt is in the range of from 5 to 35 parts by weight of dispersant to from 10 to 50 parts by weight of metal salt.

11. Additive as defined by claim 9 wherein said metal salt is a carbonate salt.

12. Additive as defined by claim 9 wherein said metal salt is selected from the class consisting of the carbonates of alkali metals and alkaline earth metals.

13. Additive as defined by claim 9 wherein said dispersant is the reaction product of an alkenyl succinic anhydride and an alkylene polyamine.

14. Additive as defined by claim 13 wherein said alkenyl succinic anhydride has an alkenyl group derived from a $C_2$ to $C_5$ monoolefin polymer having a molecular weight in the range of from 500 to 3500.

15. Additive as defined by claim 9 wherein said dispersant is the reaction product of an alkenyl succinic anhydride, a polyamine and an aliphatic carboxylic acid of from 1 to 30 carbon atoms.

16. Additive as defined by claim 9 wherein said dispersant is the reaction product of an alkenyl succinic anhydride with a polyamine and a polyhydric alcohol of from 2 to 36 carbon atoms.

17. Additive as defined by claim 9 wherein said dispersant is the reaction product of tetraethylene pentamine, acetic acid and an alkenyl succinic anhydride wherein the alkenyl group is derived from polyisobutylene of from about 700 to about 1700 molecular weight.

18. Additive as defined by claim 9 wherein said dispersant is the reaction product of tetraethylene pentamine, acetic acid and polyisobutenyl succinic acid which has been further reacted with a mixture of a phosphosulfurized polyisobutylene and mixed $C_4$ to $C_5$ dialkyl dithiophosphoric acids.

19. Additive as defined by claim 9 wherein said dispersant is the reaction product of polyisobutenyl succinic anhydride, tetraethylene glycol and tetraethylene pentamine.

20. Additive as defined by claim 9 wherein said dispersant is the amide of polyisobutenyl propionic acid and an alkylene polyamine.

References Cited

The following references, cited by the Examiner, are of record in the patented file of this patent or the original patent.

UNITED STATES PATENTS

| | | | |
|---|---|---|---|
| 3,163,603 | 12/1964 | Le Suer | 252—33.6 |
| 3,271,310 | 9/1966 | Le Suer | 252—37 X |
| 3,311,558 | 3/1967 | Prizer et al. | 252—47.5 |
| 3,321,399 | 5/1967 | Versteeg et al. | 252—18 X |
| 2,861,951 | 11/1958 | Carlyle | 252—18 X |
| 2,989,463 | 6/1961 | Mastin | 252—25 |
| 3,018,247 | 1/1962 | Anderston et al. | 252—32.7 E |
| 3,105,049 | 9/1963 | Voorhees | 252—18 X |
| 3,127,348 | 3/1964 | Versteeg | 44—51 X |
| 3,184,474 | 5/1965 | Catto et al. | 252—51.5 A |
| 3,185,645 | 5/1965 | Clayton et al. | 252—32.7 E |
| 3,216,936 | 11/1965 | Le Suer | 252—32.7 E |
| 3,220,949 | 11/1965 | Bell et al. | 252—51.5 A |
| 3,272,746 | 9/1966 | Le Suer et al. | 252—51.5 A |
| 3,342,733 | 9/1967 | Robbins et al. | 252—51.5 A |
| 3,454,496 | 7/1969 | Schlobohm et al. | 252—51.5 A |

PATRICK P. GARVIN, Primary Examiner

U.S. Cl. X.R.

44—51, 63, 71; 252—18, 25, 32.7 NC, 33.6, 37.2, 40.7, 42.1, 46.7, 49.7, 51.5 A; 260—247.7, 326.3, 326.5, 404, 404.5, 485, 561